United States Patent [19]

Douden

[11] Patent Number: 4,985,380
[45] Date of Patent: Jan. 15, 1991

[54] METHOD OF MAKING THIN REFRACTORY FLAKES

[75] Inventor: David K. Douden, Richfield, Minn.

[73] Assignee: Minnesota Mining and Manufacturing, St. Paul, Minn.

[21] Appl. No.: 339,472

[22] Filed: Apr. 17, 1989

[51] Int. Cl.$^5$ .................. C04B 35/02; C03C 12/00
[52] U.S. Cl. ................... 501/128; 501/127; 501/133; 501/84; 501/66; 501/33
[58] Field of Search .............. 501/128, 133, 95, 127, 501/84, 33, 66; 428/363; 264/43, 60, 63

[56] References Cited

U.S. PATENT DOCUMENTS

| 3,795,524 | 3/1974 | Sowman | 501/95 |
| 4,235,742 | 11/1980 | Anderson et al. | 427/221 |
| 4,349,456 | 9/1982 | Sowman | 428/402 |
| 4,671,909 | 6/1987 | Torobin | 501/84 |
| 4,757,036 | 7/1988 | Kaar | 501/95 |

Primary Examiner—Mark L. Bell
Assistant Examiner—Sue Hollenbeck
Attorney, Agent, or Firm—D. M. Sell; G. F. Chernivec

[57] ABSTRACT

Thin flakes can be made from a sol of metal oxides by a method analogous to blowing soap bubbles, preferably by directing a laminar flow of air through a narrow, annular orifice. The bubbles can be dried and broken into fragments which are fired to produce refractory flakes that can be incorporated into protective coatings. The resulting coatings can be pearlescent while also affording good resistance to abrasion and to corrosive materials.

18 Claims, 1 Drawing Sheet

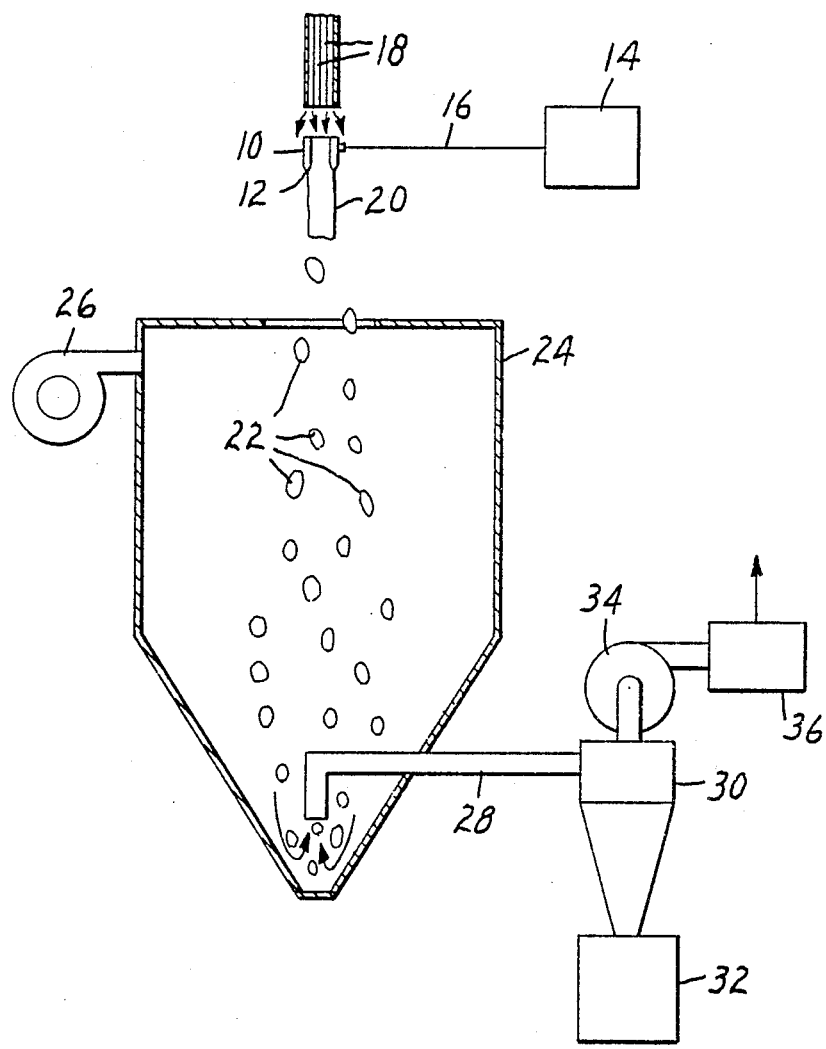

METHOD OF MAKING THIN REFRACTORY FLAKES

BACKGROUND OF THE INVENTION

1. Field of the Invention

The invention concerns a method of economically manufacturing thin refractory or ceramic flakes that can be incorporated into protective coatings for such purposes as pearlescence and resistance to abrasion and to better protect the coated substrate from corrosion.

2. Description of the Related Art

U.S. Pat. No. 3,795,524 (Sowman) discloses a method of making refractory articles (especially fibers, but also films, flakes, and microspheres) from either an aqueous solution of water-soluble aluminum and boron compounds or a colloidal dispersion of silica and water-soluble or dispersible aluminum compounds and boron compounds. Such a solution or dispersion is often called an "organosol" or a "sol-gel" or simply a "sol". To make flakes, the sol is coated onto a non-adhering smooth inert substrate and dried to form a film which may tend to crack and form flakes. After being removed from the substrate, the "film can be comminuted to form irregularly shaped particles, flakes, or aggregates, e.g., 1/16" to 1" large, 1 to 25 microns thick, or ground to powders of small size" (col. 11, ls. 39–42) that were converted to refractory flakes by being fired at temperatures up to 1000° C. "In the form of particulate materials, the refractory products can be used as fillers and/or coloring agents or pigments for paints and enamels . . . ." (col. 13, ls. 8–11). They can also be used as abrasion-resistant agents for elastomeric materials (col. 13, ls. 34–40). Refractory flakes are formed in Examples 20–23 of the Sowman patent.

U.S. Pat. No. 4,349,456 (Sowman) discloses a method of making refractory microcapsules from an organosol similar to those of the earlier Sowman '524 patent. The microcapsules after being fired have diameters within the range of about 1 to 1000 $\mu$m and a uniform wall thickness in the range generally of 0.1 to 100 $\mu$m (col. 8, ls. 16–20). The microcapsules are crushable to flakes, as shown in FIG. 2 of Sowman '456, but we fail to find in Sowman '456 any mention of utility for these refractory flakes.

European Pat. Publ. 240952 (Saegusa), published Oct. 14, 1987, concerns a process similar to that of Sowman '524 in that a thin coating of a solution or sol of a metallic compound is applied to a smooth surface, dried, and scraped off as flakes. The flakes can either be used as such or fired at a temperature of from about 200° C. to 1100° C., preferably from 500° C. to 900° C. The resulting refractory flakes are said to be from about 0.01 to about 10 $\mu$m in thickness and from about 1 to 100 $\mu$m in breadth. Uses for the flakes are said to include lustrous pigments in nail enamels, enamels, leather products, exterior automotive coatings, paints, and pearl-glazed buttons. Metallic compounds used in the examples include oxides of Zr, Ti, Al, Si, Sn.

It is believed that thin refractory flakes produced by any of the above-discussed methods would be too expensive to be put to any widespread use.

SUMMARY OF THE INVENTION

The invention concerns a method of making thin refractory flakes that should be more economical than are any of the above-discussed methods of the prior art. The novel method is analogous to blowing soap bubbles and includes the sequential steps of
  (a) forming a sol of metal oxide and a surfactant,
  (b) forming bubbles of the sol having an average diameter of at least 1 cm,
  (c) drying the bubbles,
  (d) collecting and breaking the dried bubbles into fragments, and
  (e) firing the fragments to provide thin refractory flakes.

A preferred sol precursor for use in step (a) is a mixture of metal oxides, preferably a mixture of $Al_2O_3$, $B_2O_3$, and $SiO_2$ having an alumina:boria mol ratio of from 9:2 to 6:3 and containing up to 65 weight percent silica, preferably 20 to 50 weight percent silica, as described in U.S. Pat. No. 3,795,524 (Sowman. The resulting thin refractory flakes are transparent and colorless and afford exceedingly good resistance to abrasion and corrosion when incorporated into protective coatings. Another preferred sol precursor is titanium lactate. Also believed to be useful are any of the ceramic metal oxides identified at col 3, ls. 37–60 of the above-cited Sowman patent, which disclosure is incorporated herein by reference.

Thin refractory flakes have been made by the above-outlined method from sols including from about 5 to 30% by weight of metal oxide. At the lower end of that range, thinner flakes are obtained. At the higher end, faster production rates can be achieved, but at about 30% by weight metal oxide, the viscosity can become so high as to make it difficult to form bubbles.

The sol formed in step (a) should include sufficient surfactant to enable the sol to span the loop or annular orifice of step (b) and to allow that span to be propelled by a stream of air as a bubble. Preferred surfactants include ethoxylated alcohol sulfate, dodecylbenzenesulfonic acid, fatty acid amine oxide, and linear alcohol alkoxylate. Preferably the surfactant comprises from 5 to 15 weight percent of total solids in the sol precursor.

In order to produce bubbles of thinner wall thicknesses, the sol may include a film former such as poly(-vinyl pyrrolidine), dextrin, methyl glucoside, or dextrose. In order to increase the size of the undulating cylinder into which the sol is being blown, the sol may include a rheology modifier such as poly(ethylene oxide). The sol may also include a drying aid such as ethanol or isopropanol.

The forming step (b) can employ a wire loop of the type used by a child to blow soap bubbles. Faster production rates are attained by forming the bubbles through an annular orifice that is narrow, e.g., from 0.05 to 0.4 mm in width. The annular orifice should be sufficiently large, e.g., at least 1 cm in diameter, to produce bubbles of reasonably large size for efficient production.

In order to produce bubbles continuously, they should be formed in step (b) by continuously directing a stream of air, preferably laminar, through the orifice while keeping the orifice continuously wet with the sol. In general, a faster air flow produces smaller bubbles and also increases the rate of production, but care must be taken not to blow the sol completely off the orifice. If this should happen accidentally, production would be interrupted until the orifice could be reprimed. Furthermore, vestiges of the sol that would be blown out without forming bubbles would contaminate the product.

The stream of air preferably is heated to make the bubbles dry faster, but the temperature of the heated air preferably is not above 60° C. in order to guard against the bubbles breaking before becoming dried. Another way of achieving faster drying of the bubbles and consequently a higher production rate is to reduce the relative humidity of the stream of air, but preferably not below 15%, because exceedingly dry air can result in a gummy residue of the sol on the walls of the orifice and the need for periodic shutdowns to clean it off.

Because the bubbles have very thin walls and dry in step (c) to a brittle state, they tend to break into very small fragments upon contacting any solid surface while being collected in step (d), but the fragments are so fluffy that they are easily wafted to a collector. When the fragments are larger than desired, the firing step (e) may first involve partial firing to densify the fragments, thus making them easier to break. For example, partial firing may be carried out at a temperature of about 500°–700° C., followed by milling, and then completing the firing at 700°–1100° C.

Whether subjected to one or two firings in step (e), the fragments may shrink from 20 to 30%, some becoming flatter and others somewhat contorted, but each of the resulting refractory flakes is generally flat and of substantially uniform thickness.

DETAILED DISCLOSURE

The average thickness of refractory flakes produced by the above-outlined method typically is less than 2 $\mu$m, usually less than 1 $\mu$m. A thickness of less than 1 $\mu$m is preferred when the refractory flakes are to be incorporated into protective coatings, thus permitting the surfaces of those coatings to be smooth. Where the corrosion resistance of the protective coatings is of utmost importance, the average thickness of the refractory flakes is preferably less than 1 $\mu$m, so that any corrosive material must take a serpentine path between the flakes to reach the surface of the coated object.

The thin refractory flakes produced by the novel method can be substantially transparent and colorless (as noted above) and, when having a high index of refraction, can impart pearlescence to a protective coating. Protective coatings of especially good brightness have been attained with transparent refractory flakes of the invention that have a high index of refraction and thicknesses of from about 0.04 to 0.06 $\mu$m.

The thin refractory flakes of the invention can have any of a variety of colors by selecting the metal oxides from which they are formed. By also being transparent, they can impart to a transparent paint a coloring comparable to a stained glass.

The novel refractory flakes can be opaque and thus afford excellent hiding power to paint and enamel coatings. Metal oxides that can be converted into a sol in step (a) of the above-outlined method include $ZrO_2$; $SiO_2$, $Fe_2O_3$, $BaTiO_3$, $ZrTiO_4$, $TiO_2$, $CaTiO_3$, $ZrSiO_4$, and a mixture of $Al_2O_3$, $B_2O_3$ and $SiO_2$.

Because the invention should make it possible to produce thin, colored, refractory flakes at a cost no greater than that of presently commercial transparent pigments, the novel colored flakes should be useful as pigments for protective coatings even where there is no need for the other useful properties that they impart. The novel colored flakes should also be useful as pigments for other articles such as can be molded from thermoplastic and thermosetting resins, e.g., automotive body parts.

THE DRAWING

The invention may be more readily understood in reference to the drawing, the single figure of which schematically shows apparatus for producing thin refractory flakes by the method of the invention.

The illustrated apparatus includes a bubble-forming head 10 which is formed with a narrow annular orifice 2 that is continuously being kept wet with a sol of metal oxides flowing from a supply tank 14 through tubing 16. A pipe 18 containing a plurality of small tubes directs a laminar flow of air into and around the orifice 12, thus forcing the sol into an undulating cylinder 20 from which bubbles 22 continuously break off and float downwardly through a drying hopper 24 that is kept warm by a heated air supply 26. Near the bottom of the hopper is a discharge duct 28 into which the bubbles 22 and fragments of broken bubbles are drawn by a cyclone collector 30. The bubbles continue to break into tiny fragments as they strike the walls of the duct 28 and cyclone collector, which fragments eventually fall into a bin 32 at the base of the collector. The cyclone collector 30 also, is fitted with an exhaust blower 34 and a dust filter 36.

In the examples, all parts are given by weight.

Example 1

| | Parts |
|---|---|
| The following were combined into a sol: | |
| titanium lactate sol (28.25% $TiO_2$) | 165 |
| zirconium diacetate solution (25% $ZrO_2$) | 143 |
| surfactant ("Mirataine" CBS) in ethanol (1:1) | 30 |
| surfactant, fatty acid amine oxide ("Ammonyx" LO) in isopropanol (1:1) | 16 |
| film former, corn syrup ("Star Dri" 10), 40% in water | 70 |
| rheology modifier, poly(ethylene oxide) [0.4% "Polyox" WSR 301 in water] | 24 |
| deionized water | 67 |
| drying agent, ethanol (200 proof) | 46 |

The sol was blown into bubbles using apparatus as shown in the drawing wherein the bubble-forming head 10 had an annular orifice 1.9 cm in diameter and a gap of 0.2 mm. Compressed air at about 20 kPa was directed through the pipe 18 that had an inside diameter of 3.8 cm and was filled with small tubes, each 9.5 mm in diameter. The temperature in the drying hopper 24 was about 50° C. The dried bubbles were collected as fragments which then were baked ½ hour at 150° C. and fired at 400° C./30 minutes followed by 800° C./6 minutes to produce colorless, transparent, refractory flakes about 0.1 to 0.2 $\mu$m in thickness.

After being crushed and screened through 44 $\mu$m openings, 6 parts of the refractory flakes were dispersed into 85 parts of a solution of an acrylic resin ("Acrylamac" 5136 from Valspar/McWhorter) and 15 parts of a solution of an aminoplast resin ("Resimene" 717 from Monsanto). This was then coated onto a glass slide, dried for 30 minutes, and baked at 155° C. for 10 minutes to provide a smooth, pearlescent protective enamel coating about 75 $\mu$m in thickness.

Examples 2 and 3

| | Parts | |
|---|---|---|
| | Example 2 | Example 3 |
| The following were combined into sols: | | |

-continued

Examples 2 and 3

| | Parts | |
|---|---|---|
| | Example 2 | Example 3 |
| sol of a mixture of $Al_2O_3$, $B_2O_3$, and $SiO_2$ at a mol ratio of 3:1:2 (32% solids in deionized water) | 7.25 | 6.30 |
| deionized water | 1.00 | 1.00 |
| $Fe(NH_4)_2 SO_4.6H_2O$ | 0.25 | |
| cobalt acetate | | 0.15 |
| surfactant, dodecylbenzene sulfonic acid (from Stepan, Northfield, IL) in isopropanol (1:1) | 0.40 | 0.35 |
| surfactant, ethoxylated alcohol sulfate ("Neodol" 253A from Shell Chemical) in acetic acid (5:1) | 0.10 | 0.10 |

Bubbles were blown by a person's mouth after dipping into the sol a wire 1 mm in diameter that had been formed into a loop 2.5 cm in diameter. The bubbles dried as they were allowed to float to the floor where they shattered into fragments that were collected and placed as a fluffy mass in a crucible to a depth of about 5 cm. This was baked for one hour at 150° C. and then fired in an oven fitted with an exhaust for volatile organic matter, first at 300° C./2½ hours, next while the temperature increased to 700° C. over a period of 30 minutes, and then held for 30 minutes at 700° C. The resulting refractory flakes of Example 2 were transparent and pale yellow in color, while those of Example 3 were transparent and pale blue-violet. The refractory flakes of both examples were from about 0.5 to 1.0 μm in thickness and from about 0.4 to 1.5 mm in breadth.

EXAMPLE 4

Three parts of the sol of Example 2, except omitting the iron compound, was admixed with one part of 2% poly(ethylene oxide) in water and one part of $Fe_2O_3$ ("Hansen" B grade, micronized from Hansen Eng., West Alexander, PA). Fragments prepared and treated in the same way as in Examples 2 and 3 provided red opaque refractory flakes of about the same size as those of Examples 2 and 3.

EXAMPLE 5

Refractory flakes were made in the same way as in Example 4 except replacing the $Fe_2O_3$ with 0.6 part of $TiO_2$ ("Titanox" 1000 from NL Chemicals, Highstown, NJ). These flakes were white and opaque and about the same size as those of Examples 2 and 3.

Example 6

| The following were combined into a sol | Parts |
|---|---|
| sol of $TiO_2$ and lactic acid (1:0.6 mol ratio, 26% $TiO_2$ solids in deionized water) | 84 |
| $SiO_2$ sol, 25% solids in water (from Nalco Chemicals) | 1 |
| surfactant ("Ammonyx" LO) in lactic acid (1:1) | 15 |

The sol was converted into refractory flakes in the same manner as in Example 1 except being fired at 400° C./30 minutes followed by 750° C./30 min. X-ray diffraction analysis of these refractory flakes showed a mixture of anatase and rutile. These flakes were transparent and colorless and about the size of those of Examples 2 and 3.

EXAMPLE 7

Refractory flakes were made as in Example 6 except that the final firing was at 1000° C./ 30 min. X-ray diffraction analysis of these refractory flakes showed only a rutile peak.

Example 8

| The following were combined into a sol: | Parts |
|---|---|
| sol of a mixture of $Al_2O_3$, $B_2O_3$, and $SiO_2$ at a mol ratio of 3:1:2 (28.8% solids in deionized water) | 10.0 |
| surfactant, dodecylbenzene sulfonic acid in isopropanol (1:1) | 1.0 |
| surfactant, ethoxylated alcohol in acetic acid (5:1) sulfate | 0.5 |

The sol was converted into fragments in the same manner as in Examples 2 and 3 except that they that were first fired at 600° C./1 hour and then at 900° C./30 minutes. The resulting refractory flakes were colorless and transparent and about the size of those of Examples 2 and 3.

Example 9

| The following were combined into a sol: | Parts |
|---|---|
| sol of iron lactate 9% $Fe_2O_3$ ($Fe_2O_3$: lactic acid 1:1) | 2.4 |
| surfactant, ethoxylated alcohol sulfate in acetic acid (1:1) | 0.15 |
| deionized water | 0.3 |

The sol was converted into fragments that were treated in the same manner as in Example 1 except that the fragments were first fired at 225° C. for 30 minutes to yield slightly transparent brownish flakes which then were fired at 900° C./30 minutes to provide red, bumpy, overfired refractory flakes about the size of those of Examples 2 and 3.

Example 10

| The following were combined into a sol: | Parts |
|---|---|
| sol of zirconium diacetate (25% $ZrO_2$) | 5.0 |
| surfactant ("Ammonyx" LO) in lactic acid (1:1) | 1.0 |

The sol was converted into fragments that were treated in the same manner as in Examples 2 and 3 except being fired from room temperature to 900° C. over three hours and held at 900° C. for one hour. The resulting refractory flakes were white, transparent, and showed no crystal structure. They were about the same size as the flakes of Examples 2 and 3.

Refractory flakes of the invention can be usefully incorporated into chromatographic articles of the type disclosed in U.S. patent application Ser. No. 07/137,811 which is assigned to the company to which the present application is assigned. That application discloses chromatographic composites of a poly(tetrafluorethylene) fibril matrix and non-swellable particles enmeshed in said matrix. The non-swellable sorptive particles can be silica particles that have been treated to be surface active, e.g., "TLC grade silica" from Aldrich Chemical Co., Milwaukee, WI. The disclosure in said application is incorporated herein by reference.

Refractory flakes of the invention can be made to be magnetic, e.g, to have the formula $BaFeO_4$, or can be made to be electrically conductive, e.g., $SnO_2$.

I claim:

1. A method for making thin refractory flakes, comprising the sequential steps of
   (a) forming a sol of metal oxide and a surfactant,
   (b) continuously forming bubbles of said sol having an average diameter of greater than about 1 cm, said bubbles having sufficiently thin wall thicknesses to allow breakage thereof upon contact with a solid surface,
   (c) drying said bubbles,
   (d) collecting and breaking said dried bubbles into fragments, and
   (e) firing said fragments to provide thin refractory flakes having an average thickness of less than 2 $\mu$m.

2. The method of claim 1 wherein said bubbles are formed in step (b) through an annular orifice that is from 0.05 to 0.4 mm in width.

3. The method of claim 2 wherein said annular orifice is at least about 1 cm in diameter.

4. The method of claim 3 wherein said annular orifice is from about 2 to 5 cm in diameter.

5. The method of claim 1 wherein said bubbles are formed in step (b) by continuously directing a laminar stream of air through an orifice.

6. The method of claim 5 wherein said stream of air is heated to a temperature of up to 60° C.

7. The method of claim 6 wherein the relative humidity of said stream of air is greater than about 15%.

8. The method of claim 1 wherein said sol formed in step (a) has from about 5 to about 30% metal oxide by weight.

9. The method of claim 1 wherein said sol formed in step (a) comprises a mixture of $Al_2O_3$, $B_2O_3$, and $SiO_2$.

10. The method of claim 9 wherein said mixture has an alumina:boria mol ratio of from 9:2 to 6:3 and contains up to about 65 weight percent silica.

11. The method of claim 10 wherein said mixture contains from about 20 to about 50 weight percent silica.

12. The method of claim 1 wherein said sol formed in step (a) comprises at least one metal oxide selected to make each flake transparent and to have a color of stained glass.

13. The method of claim 1 wherein said sol formed in step (a) further includes a film former.

14. The method of claim 1 wherein said sol formed in step (a) further includes a rheology modifier.

15. The further method of claim 1 wherein said sol formed in step (a) further includes a drying aid.

16. The further method of claim 1 wherein step (e) involves partially firing to densify said fragments, breaking them into smaller pieces, and then completing the firing.

17. The method of making a batch of ceramic flakes as defined in claim 16 wherein said partial firing is carried out at a temperature of 500°-700° C. and the final firing is at 700°-100° C.

18. The method of claim 1 wherein said thicknesses are less than about 1 micron.

* * * * *

UNITED STATES PATENT AND TRADEMARK OFFICE
CERTIFICATE OF CORRECTION

PATENT NO. : 4,985,380
DATED : January 15, 1991
INVENTOR(S) : David K. Douden It is certified that error appears in the above-identified patent and that said Letters Patent is hereby corrected as shown below:

```
Col. 2, line 16 "(Sowman" should read --(Sowman)--.
Col. 4, line 9, "2" should read --12--.
Col. 4, line 23, "also," should read --also--.
Col. 6, line 20, delete the second "that".
Col. 8, line 31, "700°-100°C" should read --700°-1100°C--.
```

Signed and Sealed this

Tenth Day of November, 1992

Attest:

DOUGLAS B. COMER

*Attesting Officer*     *Acting Commissioner of Patents and Trademarks*